United States Patent
Joerg

(10) Patent No.: US 9,138,928 B2
(45) Date of Patent: Sep. 22, 2015

(54) COOLING DEVICE FOR THE DRIVE FOR ADJUSTING THE NEEDLE OF A NEEDLE VALVE NOZZLE IN HOT RUNNER SYSTEMS FOR INJECTION MOLDING MACHINES

(71) Applicant: Incoe Corporation, Troy, MI (US)

(72) Inventor: Anton Joerg, Grossostheim (DE)

(73) Assignee: INCOE CORPORATION, Troy, MI (US)

( * ) Notice: Subject to any disclaimer, the term of this patent is extended or adjusted under 35 U.S.C. 154(b) by 0 days.

(21) Appl. No.: 13/891,880

(22) Filed: May 10, 2013

(65) Prior Publication Data
US 2013/0302466 A1    Nov. 14, 2013

(30) Foreign Application Priority Data

May 11, 2012  (DE) .......................... 10 2012 009 412
Apr. 12, 2013  (EP) ..................................... 13001902

(51) Int. Cl.
  *B29C 45/74*   (2006.01)
  *B29C 45/28*   (2006.01)
  *B29C 45/27*   (2006.01)
(52) U.S. Cl.
  CPC ............... *B29C 45/74* (2013.01); *B29C 45/281* (2013.01); *B29C 2045/277* (2013.01)

(58) Field of Classification Search
  USPC ........................................................ 425/549
  See application file for complete search history.

(56) References Cited

FOREIGN PATENT DOCUMENTS

DE          60111011         5/2006
DE         102009024271     12/2010
WO      WO 2011119791 A1 *  9/2011

* cited by examiner

*Primary Examiner* — Joseph S Del Sole
*Assistant Examiner* — John Robitaille
(74) *Attorney, Agent, or Firm* — Linda D. Kennedy; Bill C. Panagos; Butzel Long, P.C.

(57) ABSTRACT

Cooling device for the drive for the adjustment of the needle (5) of a needle valve nozzle (3) in hot runner systems for injection molding machines, wherein the drive is mounted on the hot runner manifold (1) of the injection molding machine and wherein the drive housing (10), in which the drive is accommodated, is connected, on the side facing the hot runner manifold (1), with a heat sink (20) of the cooling device, which heat sink is formed as a separate part. According to the invention, the heat sink (20) of the cooling device is mounted on the side of the drive housing facing the hot runner manifold (1) without bearing the weight of the drive housing (10). The heat sink (20) is provided with through-holes, through which the supports (12), which are directly or indirectly connected to the hot runner manifold (1), can extend freely, to which supports the drive housing (10) is attached (FIG. 1).

11 Claims, 1 Drawing Sheet

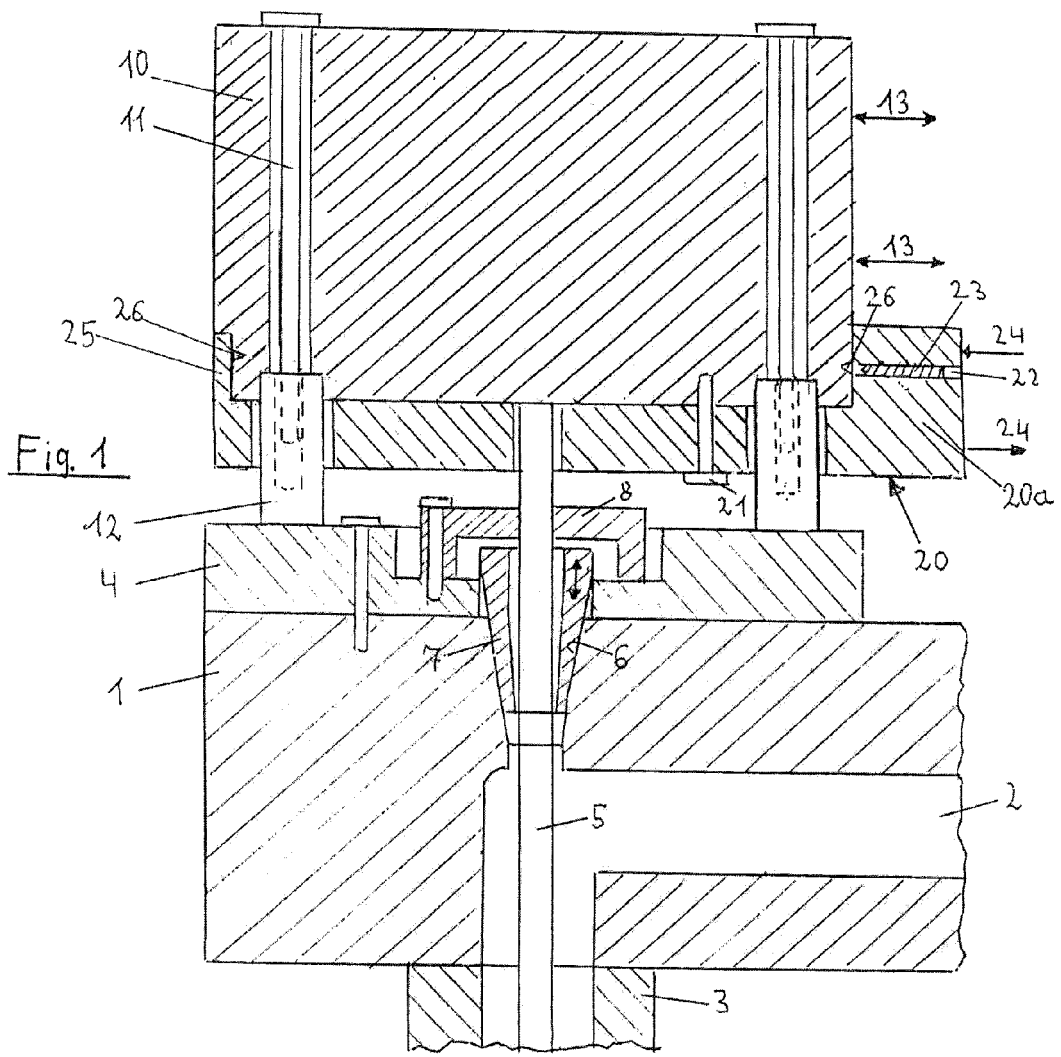
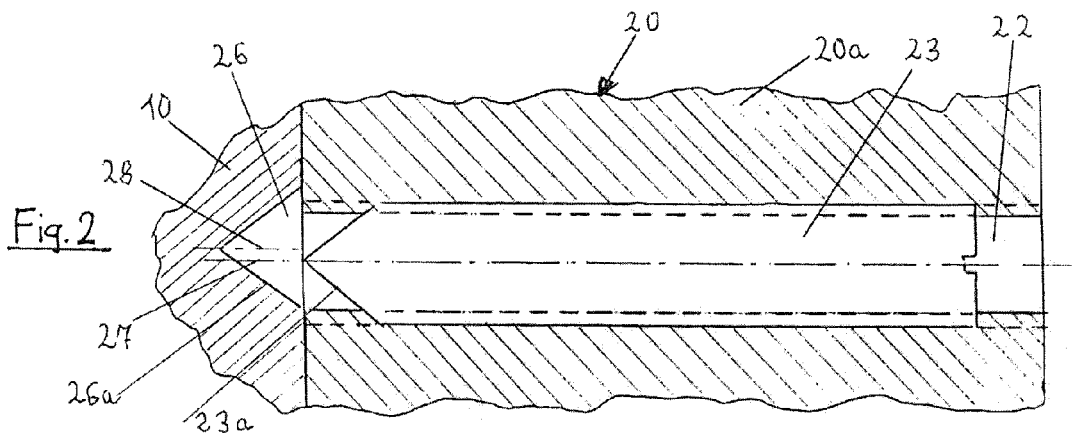

COOLING DEVICE FOR THE DRIVE FOR ADJUSTING THE NEEDLE OF A NEEDLE VALVE NOZZLE IN HOT RUNNER SYSTEMS FOR INJECTION MOLDING MACHINES

CROSS-REFERENCE TO RELATED APPLICATIONS

This application claims priority to German Patent Application No. 10 2012 009 412.4 filed on May 11, 2012 and European Patent Application No. 13001902.9 filed on Apr. 12, 2013 which are hereby incorporated by reference in their entireties.

TECHNICAL FIELD

The present disclosure relates to a cooling device for the drive for adjusting the needle of a needle valve nozzle in hot runner systems for injection molding machines according to the preamble of claim 1.

BACKGROUND

A hot runner system for an injection molding machine includes a hot runner manifold with a sprue bushing for the melt, nozzles connected to the hot runner manifold for insertion into the injection molding tool and, in the case of needle valve nozzles, drives for the adjustment of the valve needles in their longitudinal direction.

The drive for the adjustment of the needle is mounted on the hot runner manifold. The drive may be, for example, an hydraulic, a pneumatic, an electric or a magnetic drive. It is important that the drive and/or its housing be protected against the heat emanating from the hot runner manifold.

For this purpose, an arrangement in which a cooling device is installed in the lower part of the drive housing facing the manifold is already known from the prior art. This arrangement has the disadvantage that when the drive is changed the connections for the coolant flowing through the cooling device must also be disconnected. This not only requires additional time, but also causes the leakage of a limited amount of coolant.

SUMMARY

A cooling device according to the preamble of claim 1, in which the cooling device is not located in the drive housing, but is mounted as a separate cooling plate below the drive housing, is already known from DE 60111011. This cooling plate serves primarily to cool a cylindrical sealing gasket, the purpose of which is to prevent the melt rising out of the melt channel. To this end, the length of the bushing is such that it extends into the cooling plate and fits tightly against it. As a result, good cooling of the sealing gasket is achieved. The cooling plate is clamped firmly between the drive housing and the manifold, and serves as a support plate for the drive housing.

A cooling device with a separately formed heat sink is also already known from DE 102009024271. The device in this document allows the drive assembly, together with the valve needle, to be moved vertically relative to the hot runner manifold of the injection molding machine. In this device the heat sink is compressed very strongly by springs, so that it must be designed to be very stable.

The object of the present disclosure is to develop a cooling device of the above type, in which the heat sink serves only to shield the drive housing from the heat from the hot runner manifold, which heat sink is furthermore subjected to hardly any mechanically load and permits the easy removal and replacement of the drive housing and the drive, so that it is not necessary to unscrew the coolant connections.

To achieve this object, a cooling device is proposed according to the preamble of claim 1, with the present disclosure having the features specified in the characterizing part of claim 1.

Further embodiments of the disclosure are specified in the dependent claims.

BRIEF DESCRIPTION OF THE DRAWINGS

The disclosure is explained in detail based on the figures:

FIG. 1 depicts a basic embodiment of the disclosure, illustrating the general structure and mode of operation of the cooling device;

FIG. 2 depicts a detail of FIG. 1 in enlarged scale.

DETAILED DESCRIPTION

FIG. 1 depicts the basic structure of a cooling device according to the disclosure. In FIG. 1, 1 denotes a part of the hot runner manifold of a hot runner system, 2 is the melt channel in this part of the hot runner manifold and 3 is a needle valve nozzle connected to the hot runner manifold, which needle valve nozzle is inserted into a non-illustrated tool. A sealing gasket 4 is attached to the hot runner manifold 1, with an opening for the needle valve stem 5. The upper part of the opening 6 in the hot runner manifold 4 for the needle valve stem 5 has a conical shape. Into this conical opening projects sealing bushing 7, the upper part of which is cylindrical and the lower part of which is conical. With its cylindrical part, the bushing 7 can be screwed into the sealing gasket 4 and can thus be moved in a longitudinal direction, in accordance with the orientation of the drawing. In this way, the gap between the bushing 7 and the needle valve stem 5 can be made sufficiently small that almost no melt can leak through upwards. The upper part of the bushing 7 is covered by a leakage cover 8 which tightly surrounds the needle valve stem 5, which leakage cover is attached to the sealing gasket 4.

The drive housing 10 in which the drive for the valve needle 5 is located is, for the sake of clarity, shown in FIG. 1 as a solid body. The drive housing 10 is bolted onto supports 12 by means of through-bolts 11, which supports may either be integral parts of the sealing gasket 4 or of the hot runner manifold or may otherwise be attached to the sealing gasket or to the hot runner manifold. If a hydraulic drive is used, the arrows 13 indicate the alternating supply and discharge of the pressure medium, for example oil, to the chambers of the hydraulic drive cylinder.

Substantially below the drive housing 10, a heat sink 20 is attached to the drive housing. This can be done, for example, by means of screws 21 inserted from below.

The heat sink may be formed as a flat plate. It can also, as shown in the embodiment in FIG. 1, be provided with an additional lateral section 20a. It is also possible to have only cooling channels in said lateral section 20a, in which case the part of the heat sink located beneath the drive housing 10 is preferably to be formed solid.

The removal and replacement of the drive housing is particularly simple if, instead of screws 21 inserted from below, one or more screws is/are inserted from the more easily accessible side of the drive, whereby the screws engage in threaded holes of the drive housing.

Another particularly advantageous attachment of the heat sink to the drive housing consists of providing a threaded hole 22 in the lateral section 20a of the heat sink, and screwing a screw or a threaded pin (grub screw) 23 into said threaded hole, with the front end of the screw/threaded pin 23 engaging in an annular groove 26 on the drive housing 10 (see FIG. 2). In this case, a fixing of the drive housing 10 is required in the lateral direction relative to the heat sink 20, which is achieved in FIG. 1 by the protruding bead 25 extending in an annular manner. A positioning pin, for example, would however also be sufficient.

The use of a threaded pin 23 scarcely obstructs, in a spatial sense, the attachment of the connections for the inflow and outflow of the coolant for the heat sink, which connections are indicated in FIG. 1 only by the arrows 24.

According to the disclosure, the annular groove 26 and the threaded hole 22 may be spatially positioned with respect to one another in such a way that the longitudinal axis 27 (see FIG. 2) of the threaded hole in accordance with the orientation of the drawing is slightly lower than the center line 28 of the annular groove 26. As a result, when the edge 23a of the screw/threaded pin 23 strikes the edge 26a of the annular groove 26, the heat sink 20 is pulled firmly against the drive housing 10, which ensures a good cooling of the drive housing.

The shape of the tip of the screw/threaded pin 23 on the one hand and that of the cross-section of the annular groove 26 on the other hand is, as shown in FIG. 2, preferably conical or frustoconical. However, curved shapes may also result in the same effect.

Instead of an annular groove 26, a correspondingly positioned blind hole would also suffice. The annular groove, however, has the advantage that the position of the heat sink can fundamentally be rotated horizontally through 360 degrees relative to the drive housing 10. In this way, the best spatial position for the space-occupying connections for the coolant can be selected.

As can be seen in FIG. 1, the heat sink 20 surrounds, with a clearance, the mounting connection, comprising the bolt 11 and the support 12, of the drive housing 10 with the sealing gasket 4 or with the hot runner manifold 1. This means that the heat sink 20 neither serves as a support plate for the drive housing 10 nor is mechanically loaded by the clamping forces between the drive housing 10 and the sealing gasket 4 or the hot runner manifold 1. The cooling device according to the disclosure is attached practically free of load beneath the drive housing 10. This allows the heat sink to be generously equipped with channels for the coolant without any significant consideration needing to be given to the minimum wall thicknesses and mechanical strength of the heat sink.

The invention claimed is:

1. A cooling device for the drive for the adjustment of the needle of a needle valve nozzle in hot runner systems for injection molding machines, comprising:
the drive is spaced apart from and mounted by at least one support to a retaining plate or the hot runner manifold of the injection molding machine and wherein a drive housing, in which the drive is accommodated, is connected, on the side facing the hot runner manifold, with a heat sink of the cooling device mounted by suspension from the drive housing such that it is connected and in contact only with the drive housing, which heat sink is a separate part spaced apart from and not in contact with the retaining plate or the hot runner manifold, wherein at least a portion of the heat sink of the cooling device is on the side of the drive housing facing the hot runner manifold without bearing the weight of the drive housing, the heat sink surrounding with a clearance the suspension mounting such that the heat sink is substantially free of load from beneath the drive housing and free of load caused by compression when the manifold expands through heating.

2. The cooling device according to claim 1, wherein the heat sink is provided with through-holes, through which the supports, which are directly or indirectly connected to the hot runner manifold, can extend freely, to which supports the drive housing is attached.

3. The cooling device according to claim 1, wherein the supports are provided with an internal thread, into which the bolts fixing the drive housing can be screwed.

4. The cooling device according to claim 2, wherein the retaining plate comprises a sealing gasket attached to the hot runner manifold, on which sealing gasket the supports are mounted.

5. The cooling device according to claim 1, wherein the heat sink is attached to the underside of the drive housing by means of one or more screws.

6. The cooling device according to claim 1, wherein the heat sink has an additional section adjacent to the side of the drive housing, via which additional section the heat sink can be bolted to the drive housing.

7. The cooling device according to claim 1, wherein the heat sink has an additional section adjacent to the side of the drive housing, which additional section is provided with a threaded hole leading to the drive housing, and that, in line with the threaded hole, the drive housing has an annular groove, into which a screw inserted into the threaded hole will protrude.

8. The cooling device according to claim 7, wherein the said screw is a threaded pin.

9. The cooling device according to claim 1, wherein the drive housing is secured against lateral displacement by the screw/threaded pin, for example by an annular bead on the heat sink or by a positioning pin.

10. The cooling device according to claim 7, wherein the tip of the screw/threaded pin and the cross-section of the annular groove are conical or frustoconical in shape.

11. The cooling device according to claim 7, wherein the longitudinal axis of the screw/threaded pin with respect to the center line of the annular groove is slightly offset in the direction of the hot runner manifold.

* * * * *